United States Patent
Tung et al.

(10) Patent No.: US 6,201,964 B1
(45) Date of Patent: Mar. 13, 2001

(54) METHOD AND APPARATUS FOR FAST AND RANDOM ACCESS OF VARIABLE SIZED RECORDS STORED IN A PARTITIONED FORMAT

(75) Inventors: Henti Tung; John R. Sorenson, both of San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/191,205

(22) Filed: Nov. 13, 1998

(51) Int. Cl.[7] ........................................... H04Q 7/20
(52) U.S. Cl. ..................... 455/432; 455/432; 455/422; 455/433; 455/452
(58) Field of Search ............................ 455/422, 432, 455/433, 434, 435, 448, 458

(56) References Cited

U.S. PATENT DOCUMENTS

| | | | |
|---|---|---|---|
| 4,916,728 | * 4/1990 | Blair ..................................... | 455/432 |
| 5,442,806 | * 8/1995 | Barber et al. ......................... | 455/432 |
| 5,590,397 | * 12/1996 | Kojima ................................ | 455/433 |
| 5,870,674 | * 2/1999 | English ............................... | 455/432 |
| 5,903,832 | * 5/1999 | Seppanen et al. .................... | 455/432 |

\* cited by examiner

Primary Examiner—Daniel S. Hunter
Assistant Examiner—Meless Zewdu
(74) Attorney, Agent, or Firm—Philip Wadsworth; Charles D. Brown (57) ABSTRACT

A method and apparatus for storing and accessing a preferred roaming list formed of variable size system records each of which includes a system identification field, a network identification included field, a preferred_negative field, a geographical region indicator field, and an acquisition parameter information field. Each of the system records optionally includes a network identification field, a priority field, and a roaming indicator field. The network identification, priority and roaming indicator fields from the records are stored in a first array; the system identification and geographical region indicator fields are stored in a second array; the first bit of the network identification included and the preferred_negative fields are stored in a third array; the second bit of the network identification included fields from the records are stored in a fourth array; and the acquisition parameter information fields are stored in a fifth array. A first index value corresponding to a selected record to be accessed is received, and entries in the third array are evaluated in response to the first index value in order to access the first bit of the network identification included field and the preferred_negative field associated with the selected record and to determine a second index value for locating any network identification, priority or roaming indicator field associated with the selected record in the first array. Any network identification, priority or roaming indicator field associated with the selected record is then accessed in the first array using the second index value, and the system identification field and the geographical region indicator field associated with the selected record are accessed from the second array using the first index value.

16 Claims, 7 Drawing Sheets

METHOD AND APPARATUS FOR FAST AND RANDOM ACCESS OF VARIABLE SIZED RECORDS STORED IN A PARTITIONED FORMAT

BACKGROUND OF THE INVENTION

I. Field of the Invention

The present invention is directed generally to mobile telephone systems. More particularly, the present invention relates to systems and methods that permit a mobile telephone user to roam outside of the user's home service area. Still more particularly, the present invention relates to systems and methods for storing and quickly accessing records in a Preferred Roaming List (PRL) from memory in a mobile telephone.

II. Description of the Related Art

In typical mobile telephone systems, when a mobile telephone user moves outside the user's home area (also known as roaming), the user's telephone is often switched from the home system to an alternate system provider so that service can continue for the user. In order to switch the user to an alternate system provider, the mobile telephone will typically access system records in the PRL stored in the memory of the mobile phone. Based on the system records stored in the PRL, the mobile phone will typically select an alternative system service provider that will be used to continue service for the user and, based on this selection and the associated information stored in the PRL system records, the mobile phone will automatically access the selected service provider on behalf of the user.

The Telephone Industry Association/Electronics Industry Association (also known as TIA/EIA) has recently published a new standard that describes a data format to be used for system table records in a PRL. See Interim Standard entitled "Over-The-Air Service Programming Of Mobile Stations in Spread Spectrum Systems", (hereinafter "the IS-683-A Standard"), the contents of which is hereby incorporated by reference in its entirety. The IS-683-A Standard provides that each system record in the PRL will have the following eight fields:

1. SID field: a 15 bit field that includes a numerical value that is the System Identification number of the system associated with the system record;
2. NID_INCL field: a 2 bit field, the least significant bit of this field indicates whether there is a Network Identification (NID) number associated with the system record and stored in the NID field described below; the most significant bit of this record is used to specify an assumed value for the NID if no value is stored in the NID field described below; the value 11 is a reserved value;
3. NID field a 16 bit field that contains a numerical value that is the Network Identification number of the system associated with the system record;
4. PREF_NEG field: a 1 bit field indicating whether the system associated with the system record is a preferred system or a negative system.
5. GEO field: a 1 bit field that indicates whether the system associated with the system record is within the geographic region of the previous system record in the PRL (if GEO=1) or, alternatively, whether the system is in a new geographic region (if GEO=0);
6. PRI field: a 1 bit field that indicates whether the current system record has a higher priority than that of the next system record in the PRL. This field is omitted from the system record if the PREF_NEG field indicates that the system associated with system record is a negative system;
7. ACQ_INDEX field: a 9 bit field that contains an index to the acquisition parameters required for the mobile phone to access the system associated with the system record;
8. ROAM_IND field: an 8 bit field that indicates the roaming status of the associated system record; this field is omitted from the system record if the PREF_NEG field indicates that the system associated with system record is a negative system.

In current mobile telephones, the PRL is stored in the mobile phone's non-volatile memory and, during system initialization, the entire PRL is moved and stored in the unit's RAM in a single bit-packed array for later access during a System Selection and Preferred Roaming operation. One purpose of using the bit-packed form is to save memory space. Unfortunately, since each record in the PRL is variably-sized (this occurs because, as described above, some or all of the NID, PRI and ROAM_IND fields can be omitted from a given system record), the starting position in RAM of each system record in the PRL is uncertain. This uncertainty makes accessing a given system record difficult and time-consuming in current systems. More particularly, as a result of the uncertainty of the starting position in RAM of each system record in the PRL, current record accessing software must sequentially step through each system record in the System Table stored in RAM starting with the first record in the table in order to access a record that is located somewhere within the table. One other deficiency of current record accessing systems is that they do not permit the "backtracking" of records within the PRL stored in RAM. For example, if the system previously accessed the 164th record in the PRL stored in RAM and, thereafter, the system wished to access the 161st record, the accessing software would be unable to simply go back three records in the table and would instead be forced to again sequentially step through each system record in the System Table stored in RAM starting with the first record in the table in order to access the 161st record.

These problems and deficiencies are recognized and solved by the present invention in the manner described below.

SUMMARY OF THE INVENTION

The present invention uses a novel partitioned memory format for storing the PRL in RAM which facilitates that rapid storing and accessing of system records from the PRL. The partitioned memory format uses five separate arrays to store the various fields of the system records in the PRL. By applying an index value to these arrays, accessing software can rapidly access one or more fields of a particular system record in the PRL without having to sequentially step through all fields in each system record starting with the first record until the desired record is reached. This aspect of the invention not only allows the mobile phone to access all fields of a given system record rapidly but, in situations where the mobile phone wishes to access only a single field in a system record (e.g., the SID field), the present invention permits for the rapid accessing of this information in a manner which does not require the sequential accessing of other information in the PRL. In addition, the accessing system of the present invention allows for the backtracking of records in the PRL, which is not possible with the current systems as described above.

The invention also uses a novel system for reading the PRL from non-volatile memory and storing the PRL in RAM during system initialization. This novel system substantially requires no additional accesses to the non-volatile memory that are necessary to move the PRL from the non-volatile memory to RAM by organizing the system records "in place" in RAM after they have initially been moved from the non-volatile memory to RAM. Since accesses to non-volatile memory are slow, this aspect of the invention functions to minimize the time required during system initialization to re-arrange the PRL in the RAM and store the data in the partitioned format.

In accordance with one particular aspect, the present invention is directed to a method and apparatus for storing and accessing a preferred roaming list formed of variable size system records each of which includes a system identification field, a network identification included field, a preferred_negative field, a geographical region indicator field, and an acquisition parameter information field. Each of the system records optionally includes a network identification field, a priority field, and a roaming indicator field. The network identification, priority and roaming indicator fields from the records are stored in a first array; the system identification and geographical region indicator fields are stored in a second array; the first bit of the network identification included and the preferred_negative fields are stored in a third array; the second bit of the network identification included fields from the records are stored in a fourth array; and the acquisition parameter information fields are stored in a fifth array. A first index value corresponding to a selected record to be accessed is received, and entries in the third array are evaluated in response to the first index value in order to access the first bit of the network identification included field and the preferred_negative field associated with the selected record and to determine a second index value for locating any network identification, priority or roaming indicator field associated with the selected record in the first array. Any network identification, priority or roaming indicator fields associated with the selected record are then accessed in the first array using the second index value, and the system identification field and the geographical region indicator field associated with the selected record are accessed from the second array using the first index value. Other fields associated with the selected record are also accessed from the remaining arrays using the first index value.

In accordance with a further aspect, the present invention is directed to a method and apparatus for quickly retrieving system identification field information from a preferred roaming list. In this embodiment, the variable sized system records are stored in memory using the five arrays described in the paragraph above. However, in this further embodiment, a first index value corresponding to a selected one of the plurality of system records to be accessed is received and, in response to the first index value, the system identification field associated with the selected system record and stored in the second array is quickly accessed.

BRIEF DESCRIPTION OF THE DRAWINGS

The features, objects and advantages of the present invention will become more apparent from the detailed description set forth below when taken in conjunction with the drawings in which like reference characters identify corresponding items throughout and wherein.

DETAILED DESCRIPTION OF THE PREFERRED EMBODIMENTS

The present invention uses a partitioned memory format for storing the PRL in RAM. In particular, five separate arrays are used in the present invention to store the various fields of the system records in the PRL in the mobile phone's RAM. A first array (referred to as the SID_GEO array) is used to store the SID and GEO fields of the system records in the PRL. Each entry in the SID_GEO array is formed of two eight-bit words (or 16 bits total). The 15 least significant bits in each entry in this array are used to store the SID field associated with a given system record, and the most significant bit in the entry is used to store the GEO field associated with the system record. A 16 bit entry that stores the SID and GEO fields corresponding to the first system record in the PRL is stored as the first record in the SID_GEO array, a 16 bit entry that stores the SID and GEO fields corresponding to the second system record in the PRL is stored as the second record in the SID_GEO array, and so on. The complete SID_GEO array will thus contain N 16-bit entries, each of which holds the SID and GEO fields corresponding to a particular system record in the PRL.

Figure 1:
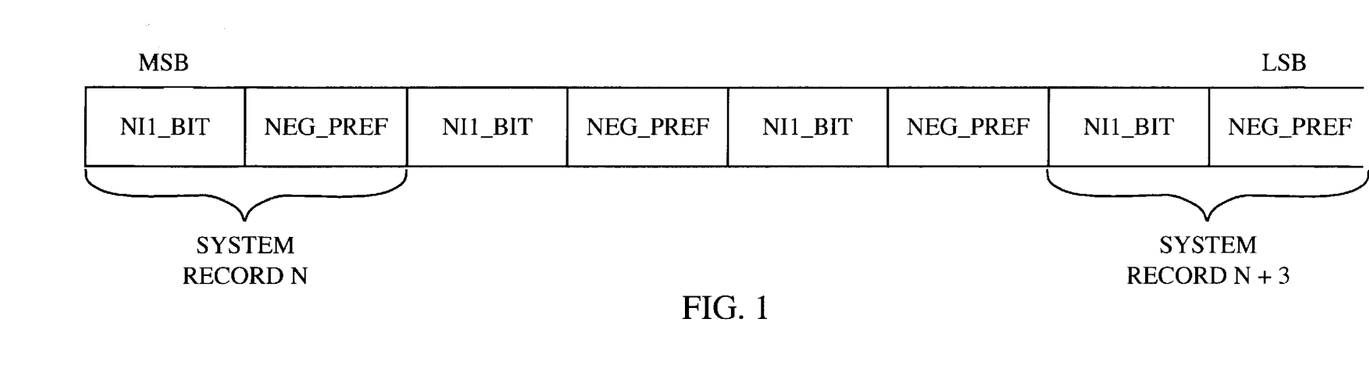
FIG. 1 is a block diagram of the data format used for storing the first bit of the network identification included and the preferred_negative fields from system records in the PRL in an array, in accordance with a preferred embodiment of the present invention.

A second array (known as the NI_PR array) is used to store the first bit of the NID_INCL field and the PREF_NEG field of the system records in the PRL. An illustration of a portion of the NI_PR array is shown in FIG. 1. Each entry in the NI_PR array is formed of a two bit record (these records may be grouped four at a time into eight bit words). The first bit in each entry in this array is used to store the first bit of the NID_INCL field associated with a given system record (this bit is also referred to as the NI1_bit), and the second bit in the entry is used to store the PREF_NEG field associated with the system record. The relative ordering of the two bits is not significant and may be arbitrarily chosen. A 2 bit entry that stores the NI1_bit and PREF_NEG field corresponding to the first system record in the PRL is stored as the first record in the NI_PR array, a 2 bit entry that stores the NI1_bit and PREF_NEG field corresponding to the second system record in the PRL is stored as the second record in the NI_PR array, and so on. The complete NI_PR array will thus contain N 2-bit entries, each of which holds the NI1_bit and PREF_NEG field corresponding to a particular system record in the PRL.

Figure 2:
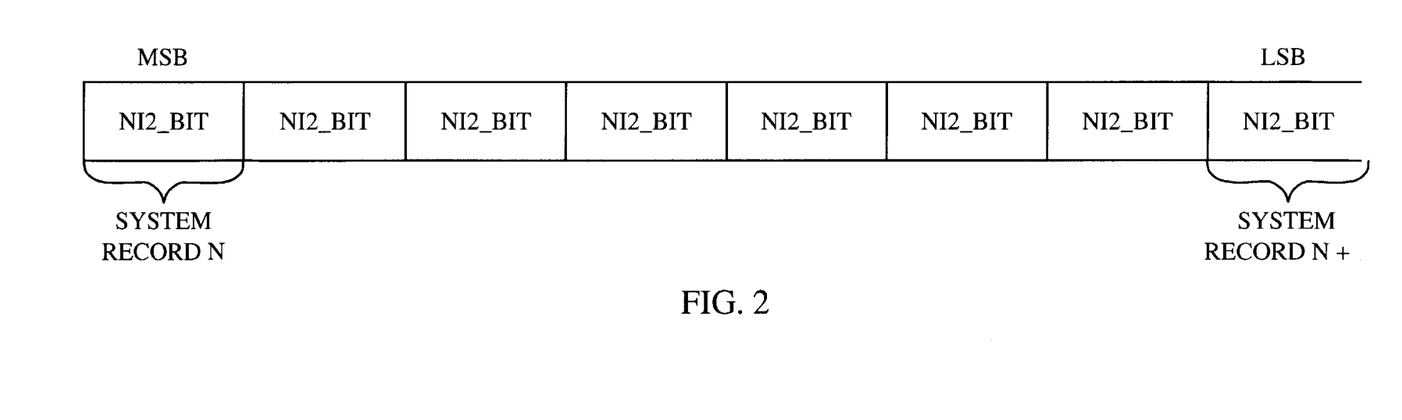
FIG. 2 is a block diagram of the data format used for storing the second bit of the network identification included fields from system records in the PRL in an array, in accordance with a preferred embodiment of the present invention.

A third array (known as the NI2_BIT array) is used to store the second bit of the NID_INCL field of the system records in the PRL. An illustration of a portion of the NI2_BIT array is shown in FIG. 2. Each entry in the NI2_BIT array is formed of a one bit record (which may be grouped eight at a time into eight bit words). The single bit in each entry in this array is used to store the second bit of the NID_INCL field associated with a given system record (this bit is also referred to as the NI2_bit). A 1-bit entry that stores the NI2_bit corresponding to the first system record in the PRL is stored as the first record in the NI2_BIT array, a 1-bit entry that stores the NI2_bit corresponding to the second system record in the PRL is stored as the second record in the NI_PR array, and so on. The complete NI2_BIT array will thus contain N 1-bit entries, each of which holds the NI2_bit corresponding to a particular system record in the PRL.

A fourth array (known as the ACQ_INDEX array) is used to store the ACQ_INDEX fields of the system records in the PRL. Each entry in the ACQ_INDEX array is formed of a 9-bit record that is stored in RAM in bit-packed form. Each 9-bit entry in this array is used to store the ACQ_INDEX field associated with a given system record. A 9-bit entry that stores the ACQ_INDEX corresponding to the first system record in the PRL is stored as the first record in the ACQ_INDEX array, a 9-bit entry that stores the ACQ_INDEX corresponding to the second system record in the PRL is stored as the second record in the ACQ_INDEX array in bit-packed format immediately adjacent to the first 9-bit entry, and so on. The complete ACQ_INDEX array will thus contain N 9-bit entries, each of which holds the ACQ_INDEX field corresponding to a particular system record in the PRL.

A fifth array (known as the MISC array) is used to store the NID, PRI and ROAM_IND fields of the system records in the PRL. As mentioned above, the NID, PRI and ROAM_IND fields may not be included in each system record. Thus, for some system records in the PRL, there may be no information corresponding to the NID, PRI and ROAM_IND fields in the MISC array. Each entry in the MISC array is formed of a variable sized record that is sized to store only the NID, PRI and ROAM_IND fields associated with a particular system record. Accordingly, if for a particular system record the PRI and ROAM_IND fields are included but the NID field is omitted, 9 bits (i.e., the collective size of the PRI and ROAM_IND fields) will be allocated in the MISC array for the particular system record. Similarly, if for a particular system record the NID field is included but the PRI and ROAM_IND fields are omitted, 16 bits (i.e., the size of the NID field) will be allocated in the MISC array for the particular system record. Similarly, if for a particular system record the NID, PRI and ROAM_IND fields are all included, 25 bits (i.e., the collective size of the NID, PRI and ROAM_IND fields) will be allocated in the MISC array for the system record. If the NID, PRI and ROAM_IND fields are all omitted for a given system record, no space will be allocated in the MISC array for the system record. The NID, PRI and ROAM_IND fields (where present) associated with each record in the PRL list are stored sequentially in the MISC array in bit-packed form. A variable sized entry (either 0 bits, 9 bits, 16 bits or 25 bits) that stores any NID, PRI and ROAM_IND fields corresponding to the first system record in the PRL is thus stored as the first record in the MISC array, a variable sized entry (either 0 bits, 9 bits, 16 bits or 25 bits) that stores any NID, PRI and ROAM_IND fields corresponding to the second system record in the PRL is stored as the second record in the MISC array in bit-packed format immediately adjacent to the first variable sized entry, and so on.

Figure 3:
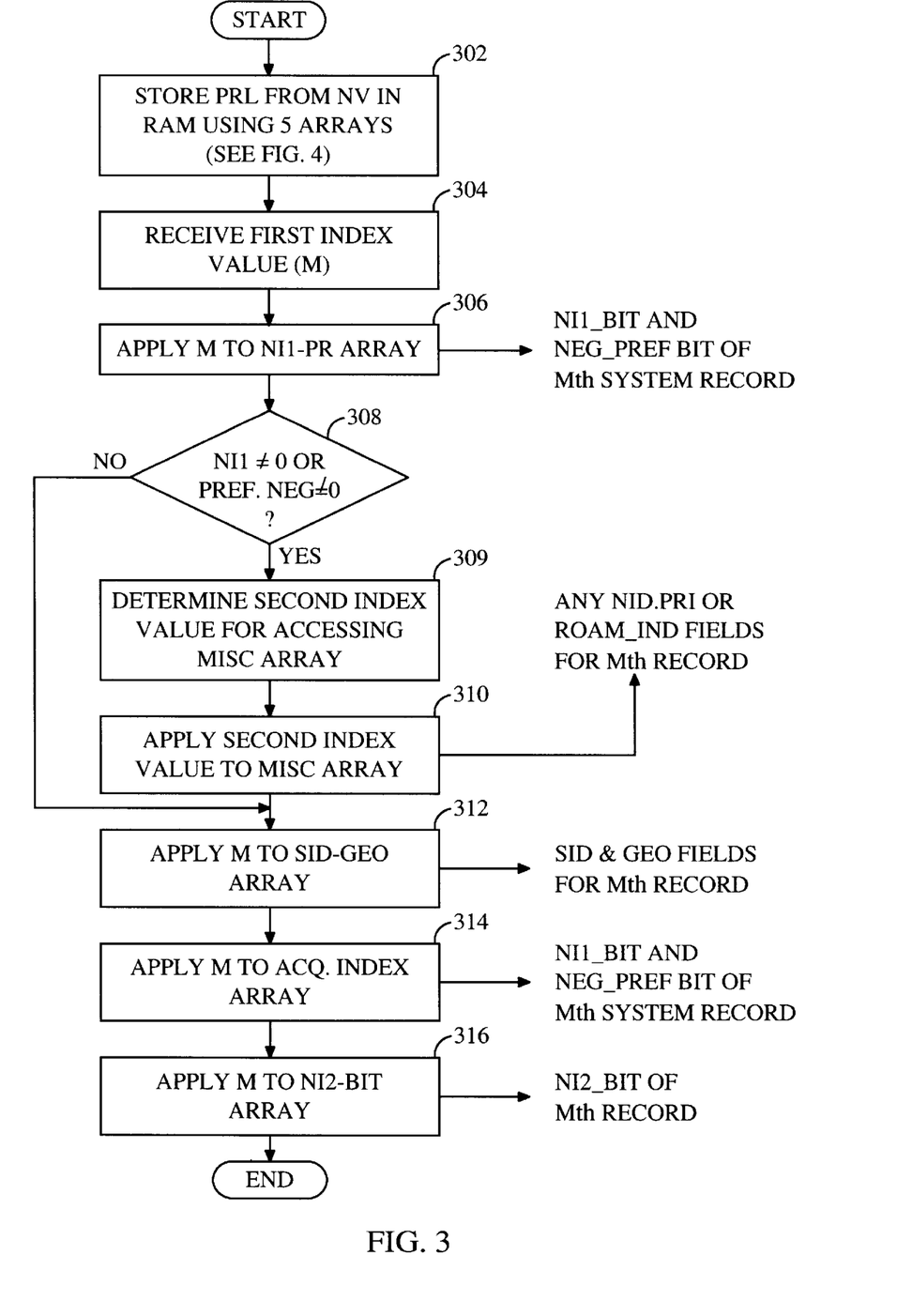
FIG. 3 is a flow diagram of a system for accessing system records in the PRL in response to an index value, in accordance with a preferred embodiment of the present invention.
Figure 4:
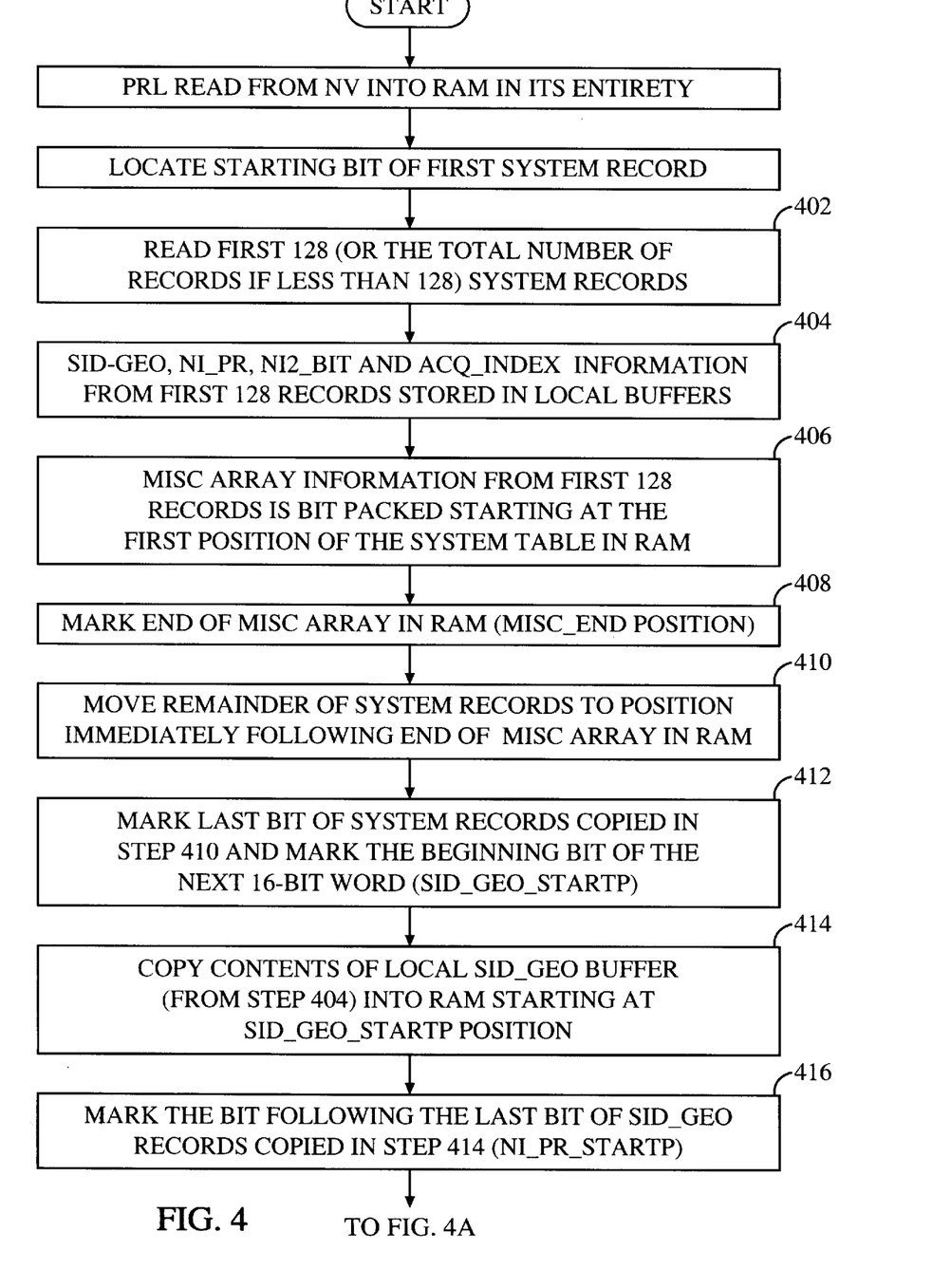
FIGS. 4, 4A, 4B and 4C are a flow diagram of a system for storing PRL system records read from non-volatile memory in a RAM in a partitioned format, in accordance with a preferred embodiment of the present invention.
Figure 4A:
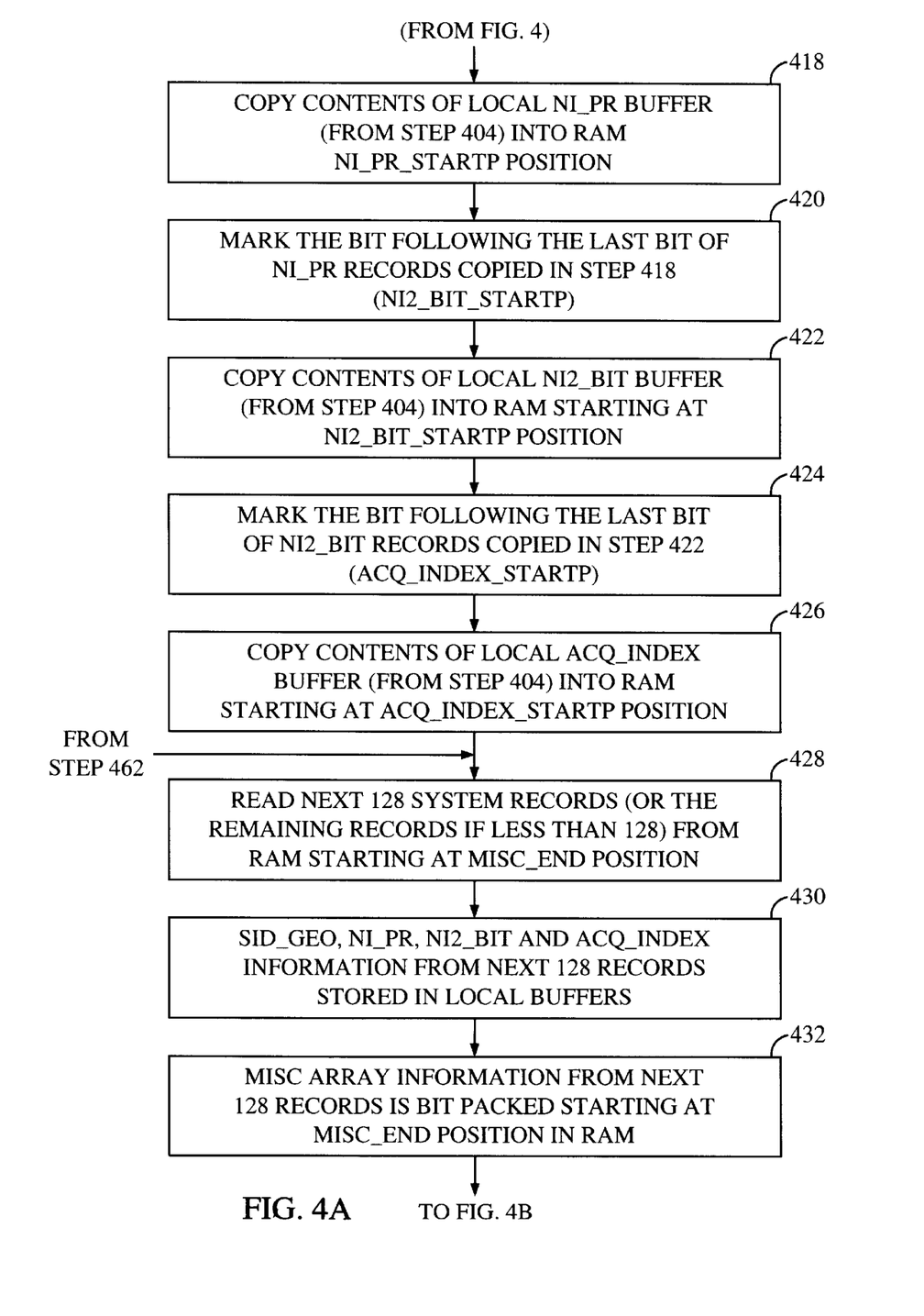
Figure 4B:
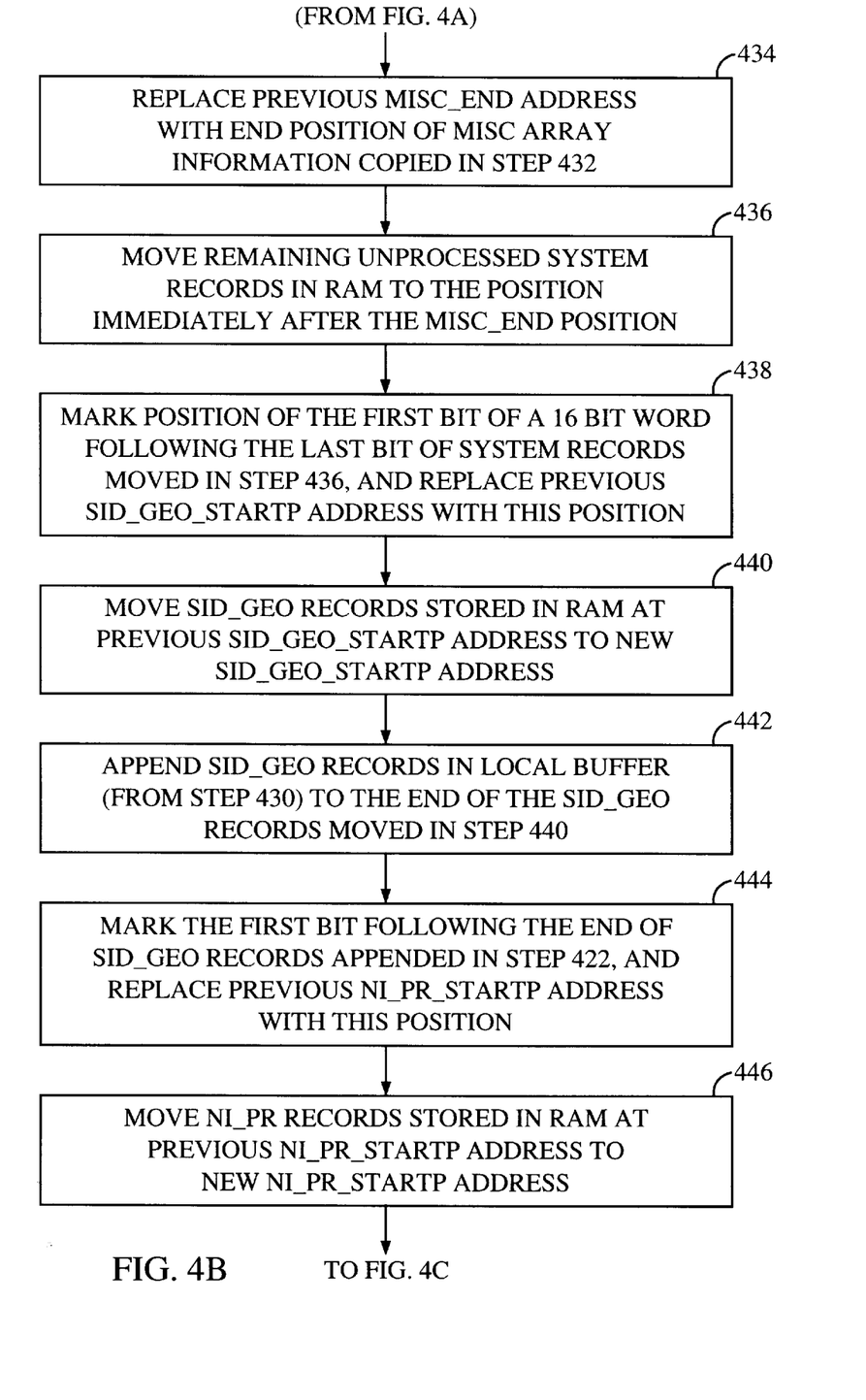
Figure 4C:
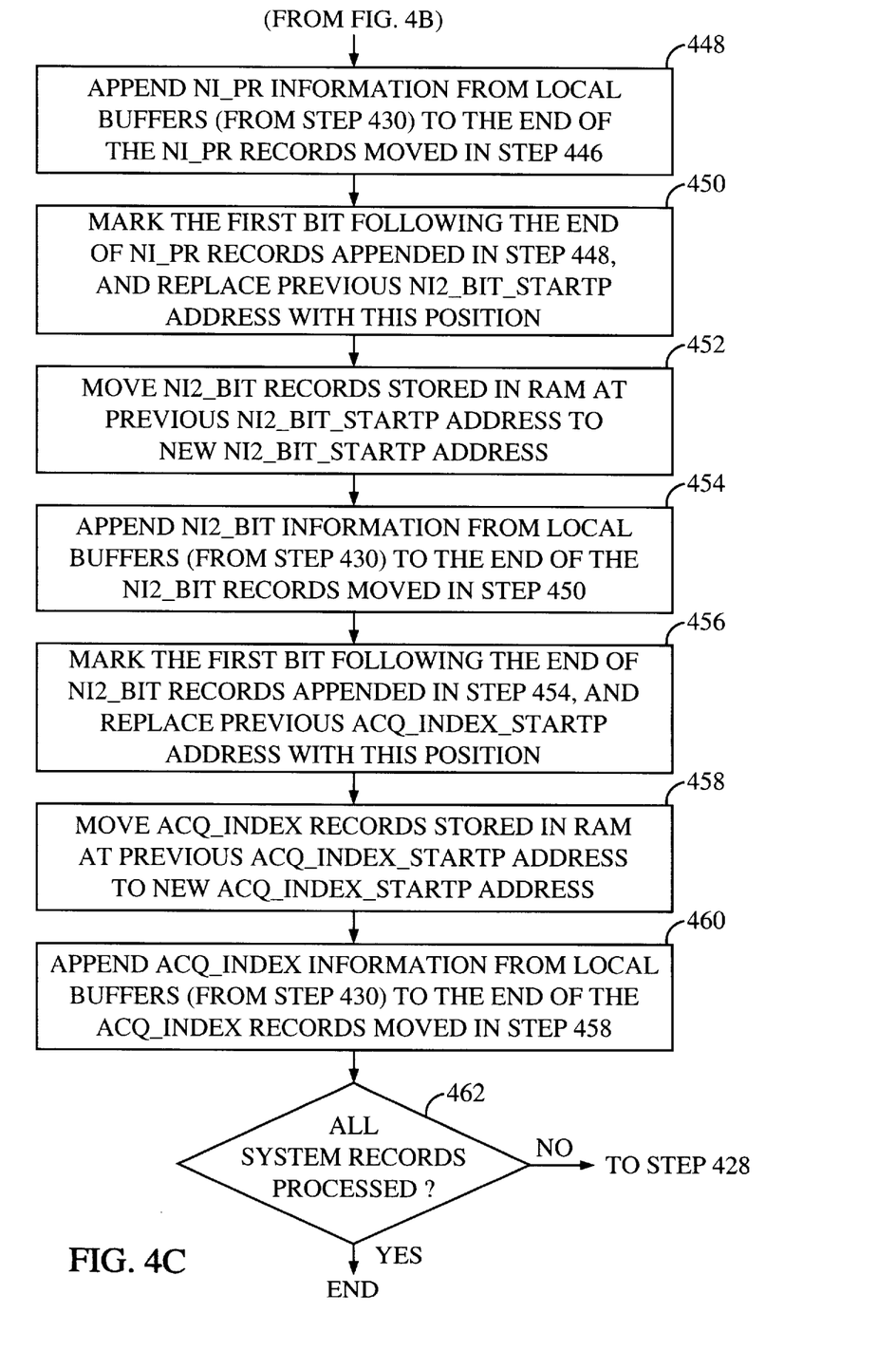

Referring now to FIG. 3, there is shown a flow diagram of a system for rapidly accessing system records in the PRL in response to an index value (M) using the SID_GEO, NI_PR, NI2_BIT, ACQ_INDEX and MISC arrays described above. The index value represents the location within the PRL of the system record to be accessed. Thus, for example, the first system record on the PRL will correspond to an index value of M=1, the second system record on the PRL will correspond to an index value of M=2, and so on. The process begins at step 302, where the PRL from the non-volatile memory in the phone is moved to the mobile's RAM and then reformatted in a partitioned format as the SID_GEO, NI_PR, NI2_BIT, ACQ_INDEX and MISC arrays described above. As mentioned previously, this step is preferably performed during system initialization. A detailed description showing a preferred implementation of step 302 is shown in FIGS. 4, 4A, 4B and 4C and described below.

Referring still to FIG. 3, in step 304, the index value (M) corresponding to the location within the PRL of a system record to be accessed is received by the accessing software. In step 306, the index value M is applied to the NI_PR array in order to determine the NI1_bit and the PREF_NEG bit associated with the system record being accessed. In step 306, the value (M−1) is first multiplied by the size of each record in the NI_PR array (i.e., two bits) and this quantity is then added to the starting address of the NI_PR array in RAM (ni_pr_startp) to find the starting address of the entry in the NI_PR array corresponding to the Mth record. Based on this starting address, the NI1_bit and the PREF_NEG bit corresponding to the desired system record are easily accessed.

If the NI1_bit and the PREF_NEG bit indicate that there is either a NID field and/or PRI and ROAM_IND fields associated with the desired system record (step 308), then in step 309 the system sequentially evaluates each entry in the NI_PR array starting at the first entry and continuing until the M−1th entry in the array. During this process, a counter is first initialized to zero and thereafter, each entry in the NI_PR array (which will have one of the following values: 00, 01, 10, or 11) up until the M−1th entry is sequentially applied to a look-up table which uses the counter to maintain a running count of the number of bits in the MISC array associated with the first M−1 entries in the NI_PR array. More particularly, for each entry in the NI_PR array having the value 00 (indicating that the NID, PRI and ROAM_IND fields are not included for the record), the running counter will be incremented by 0 bits; for each entry in the NI_PR array having the value 01 (indicating the PRI and ROAM_IND fields are included and the NID field is not included for the record), the running counter will be incremented by 9 bits; for each entry in the NI_PR array having the value 10 (indicating the PRI and ROAM_IND fields are not included and the NID field is included for the record), the running counter will be incremented by 16 bits; and for each entry in the NI_PR array having the value 11 (indicating that the NID, PRI and ROAM_IND fields are all included for the record), the running counter will be incremented by 25 bits. After all of the M−1th records in the NI_PR have been evaluated in this manner, the final value of the running counter will correspond to the second index value referred to above. In step 310, the second index value is added to the starting address of the MISC array in RAM (misc_startp) to find the starting address of the entry in the MISC array corresponding to the Mth record. Based on this starting address, the information in any NID, PRI or ROAM_IND fields corresponding to the desired system record are easily accessed.

Although in the embodiment of step 309 described above, each record in the NI_PR array was individually applied to the look-up table in sequential order to determine the final value of the running counter, it will be understood by those skilled in the art that multiple entries from the NI_PR array could be grouped and collectively applied to a look-up table in order to expedite the process of calculating the second index value. For example, adjacent pairs of entries in the NI_PR array could be applied in 4-bit groups to a look-up table having 16 entries (instead of the 4 entry table described above) in order to expedite the process of calculating the second index value.

In step 312, the index value M is applied to the SID_GEO array in order to determine the values of the SID and GEO field associated with the system record being accessed. In step 312, the value (M−1) is first multiplied by the size of each record in the SID_GEO array (i.e., 16 bits) and this quantity is then added to the starting address of the SID_GEO array in RAM (sid_geo_startp) to find the starting address of the entry in the SID_GEO array corresponding to the Mth record. Based on this starting address, the SID and GEO fields corresponding to the desired system record are easily accessed.

In step 314, the index value M is applied to the ACQ_INDEX array in order to determine the value of the ACQ_INDEX field associated with the system record being accessed. In step 314, the value (M−1) is first multiplied by the size of each record in the ACQ_INDEX array (i.e., 9 bits) and this quantity is then added to the starting address of the ACQ_INDEX array in RAM (acq_index_startp) to find the starting address of the entry in the ACQ_INDEX array corresponding to the Mth record. Based on this starting address, the ACQ_INDEX field corresponding to the desired system record is easily accessed.

Finally, in step 316, the index value M is applied to the NI2_BIT array in order to determine the values of the NI2_bit associated with the system record being accessed. In step 316, the value (M−1) is first multiplied by the size of each record in the NI2_bit array (i.e., 1 bit) and this quantity is then added to the starting address of the NI2_BIT array in RAM (ni2_bit_startp) to find the starting address of the entry in the NI2_BIT array corresponding to the Mth record. Based on this starting address, the NI2_bit corresponding to the desired system record is easily accessed.

In a preferred embodiment of the present invention, where only the SID field corresponding to a particular system record is desired, steps 306, 308–310, 314 and 316 can be skipped from the method shown in FIG. 3. In this embodiment, after storage of the arrays in step 302 and receipt of the index value (M) in step 304, the process proceeds directly to step 312 where the index value M is used as described above to access the SID field associated with the desired system record.

In a further embodiment which can be used after the system shown in FIG. 3 has been used to access the Mth record in the PRL, the present invention can be used to backtrack through the PRL to quickly access a record that preceded the Mth record in the PRL. For example, if the system desired to access the (M−2)th record, it would simply use the array starting addresses calculated during the accessing of the Mth record and then decrement those values accordingly in order to locate the fields corresponding to the (M−2)th record in the five arrays discussed above.

Referring now to FIGS. 4, 4A, 4B and 4C, there is a flow diagram of a system for reformatting in partitioned format in RAM PRL system records read from non-volatile memory. Initially, the PRL is read in its entirety from the non-volatile memory into the RAM and the starting position of the first record in RAM is located. Next, in step 402, a first group of system records (e.g., 128 records or the total number of records if less than 128 exist) are read from the RAM. The size of the group of records read in step 128 could be more or less than 128, but is preferably a multiple of 8. In step 404, the SID and GEO fields associated with the first group of system records are stored in a first local buffer; the NI1_bits and the PREF_NEG fields associated with the first group of system records are stored in a second local buffer; the NI2_bits associated with the first group of system records are stored in a third buffer; and ACQ_INDEX fields associated with the first group of system records are stored in a fourth local buffer.

In step 406, the NID, PRI and ROAM_IND fields (i.e., the MISC array information fields) associated with the first group of system records are stored in bit-packed form in a first area in the RAM. The starting position in RAM of this first area used for storing the bit-packed MISC array information fields is stored as the misc_startp address. Next, in step 408, the end position in RAM of the NID, PRI and ROAM_IND fields stored in step 406 is marked as the MISC_END position (i.e., the current end point of the MISC array in RAM). Next, in step 410, all remaining un-read system records from the non-volatile memory (i.e., all system records other than those read into RAM in the first group) are moved from their current position in RAM and stored in the RAM starting immediately after the MISC_END position.

In step 412, the end position in RAM of the unprocessed system records stored in step 410 is marked, and the address of the first 16 bit word following this position is stored as the value sid_geo_startp (this value will be used to store the starting position of the SID_GEO array in RAM during the data partitioning process). In step 414, a portion of the SID_GEO array is next stored in the RAM by copying the contents of the first local buffer into the RAM starting at the sid_geo_startp position.

In step 416, the bit following the end position in RAM of the SID_GEO information stored in step 414 is marked and stored as the value ni_pr_startp (this value will be used to store the starting position of the NI_PR array in RAM during the data partitioning process). In step 418, a portion of the NI_PR array is next stored in RAM by copying the contents of the second local buffer into RAM starting at the ni_pr_startp position.

In step 420, the bit following the end position in RAM of the NI_PR information stored in step 418 is marked and stored as the value ni2_bit_startp (this value will be used to store the starting position of the NI2_BIT array in RAM during the data partitioning process). In step 422, a portion of the NI2_BIT array is next stored in RAM by copying the contents of the third local buffer into RAM starting at the ni2_bit_startp position.

In step 424, the bit following the end position in RAM of the NI2_BIT information stored in step 422 is marked and stored as the value acq_index_startp (this value will be used to store the starting position in RAM of the ACQ_INDEX array during the data partitioning process). In step 426, a portion of the ACQ_INDEX array is next stored in RAM in bit-packed form by copying the contents of the fourth local buffer into RAM starting at the acq_index_startp position.

If the total number of records is greater than the number of records in the first group of system records, then following the processing of the first group of system records as described above, processing proceeds to step 428, where a further group of unprocessed system records (e.g., 128 records or the remaining number of records if less than 128 exist) are read from the RAM starting at the MISC_END position (i.e., the current end point of the MISC array in RAM). In step 430, the SID and GEO fields associated with the further group of system records are stored in the first local buffer; the NI1_bits and the PREF_NEG fields associated with the further group of system records are stored in the second local buffer; the NI2_bits associated with the further group of system records are stored in the third buffer; and the ACQ_INDEX fields associated with the further group of system records are stored in the fourth local buffer.

In step 432, the NID, PRI and ROAM_IND fields (i.e., the MISC array information fields) associated with the further group of system records are stored in RAM in bit-packed form starting at the MISC_END position. Next, in step 434, the end position in RAM of the NID, PRI and ROAM_IND fields stored in step 432 is marked and stored as the new value of the MISC_END position (i.e., the current end point of the MISC array in RAM). Next, in step 436, all remaining unprocessed system records in RAM (i.e., all system records other than those read in the first group or during any iterations of step 428) are read from the RAM and moved to a position in RAM starting immediately after the new value of the MISC_END position.

In step 438, the address of the first 16 bit word following the end position in RAM of the last bit of the unprocessed system records moved in step 436 is marked and stored as the new value of sid_geo_startp (i.e., the current starting position of the SID_GEO array in RAM). Next, in step 440, the SID_GEO records previously stored in RAM at the previous sid_geo_startp position (i.e., the value of sid_geo_startp prior to updating of this address in step 438), are moved to RAM starting at a position corresponding to the new value of sid_geo_startp. In step 444, a further portion of the SID_GEO array is stored in RAM by copying the contents of the first local buffer into RAM starting immediately after the end of the records moved in step 440.

In step 444, the bit following the end position in RAM of the SID_GEO information stored in step 442 is marked and stored as the new value of ni_pr_startp (the current starting position of the NI_PR array in RAM). Next, in step 446, the NI_PR records previously stored in RAM at the previous ni_pr_startp position (i.e., the value of ni_pr_startp prior to updating of this address in step 444), are moved to RAM starting at a position corresponding to the new value of ni_pr_startp. In step 448, a portion of the NI_PR array is next stored in the RAM by copying the contents of the second local buffer into RAM starting immediately after the end of the records moved in step 446.

In step 450, the bit following the end position in RAM of the NI_PR information stored in step 448 is marked and stored as the new value of ni2_bit_startp (the current starting position of the NI2_BIT array in RAM). Next, in step 452, the NI2_BIT records previously stored in RAM at the previous ni2_bit_startp position (i.e., the value of ni2_bit_startp prior to updating of this address in step 450), are moved to RAM starting at a position corresponding to the new value of ni2_bit_startp. In step 452, a portion of the NI2_BIT array is next stored in RAM by copying the contents of the third local buffer into RAM starting immediately after the end of the records moved in step 452.

In step 456, the bit following the end position in RAM of the NI2_BIT information stored in step 454 is marked and stored as the new value of acq_index_startp (the current starting position of the ACQ_INDEX array in RAM). Next, in step 458, the ACQ_INDEX records previously stored in RAM at the previous acq_index_startp position (i.e., the value of acq_index_startp prior to updating of this address in step 456), are moved to RAM starting at a position corresponding to the new value of acq_index_startp. In step 460, a portion of the ACQ_INDEX array is next stored in the RAM by copying the contents of the fourth local buffer into RAM starting immediately after the end of the records moved in step 458.

In step 462, the system tests to determine whether all the system records in the PRL have been processed in accordance with the above method; if not, the system proceeds to step 428 where the method is repeated until all system records have been processed. Following the end of this process, the PRL will be stored in the RAM in partitioned format in the five arrays described above.

The method described above in connection with FIGS. 4, 4A, 4B and 4C is particularly advantageous because all data reformatting takes place in the RAM occupied by the PRL. Little additional memory is needed to perform the reformatting operations, other than the memory needed to store the geo_sid_startp, ni_pr_startp, ni2_bit_startp, and acq_index_startp values.

Figure 5:
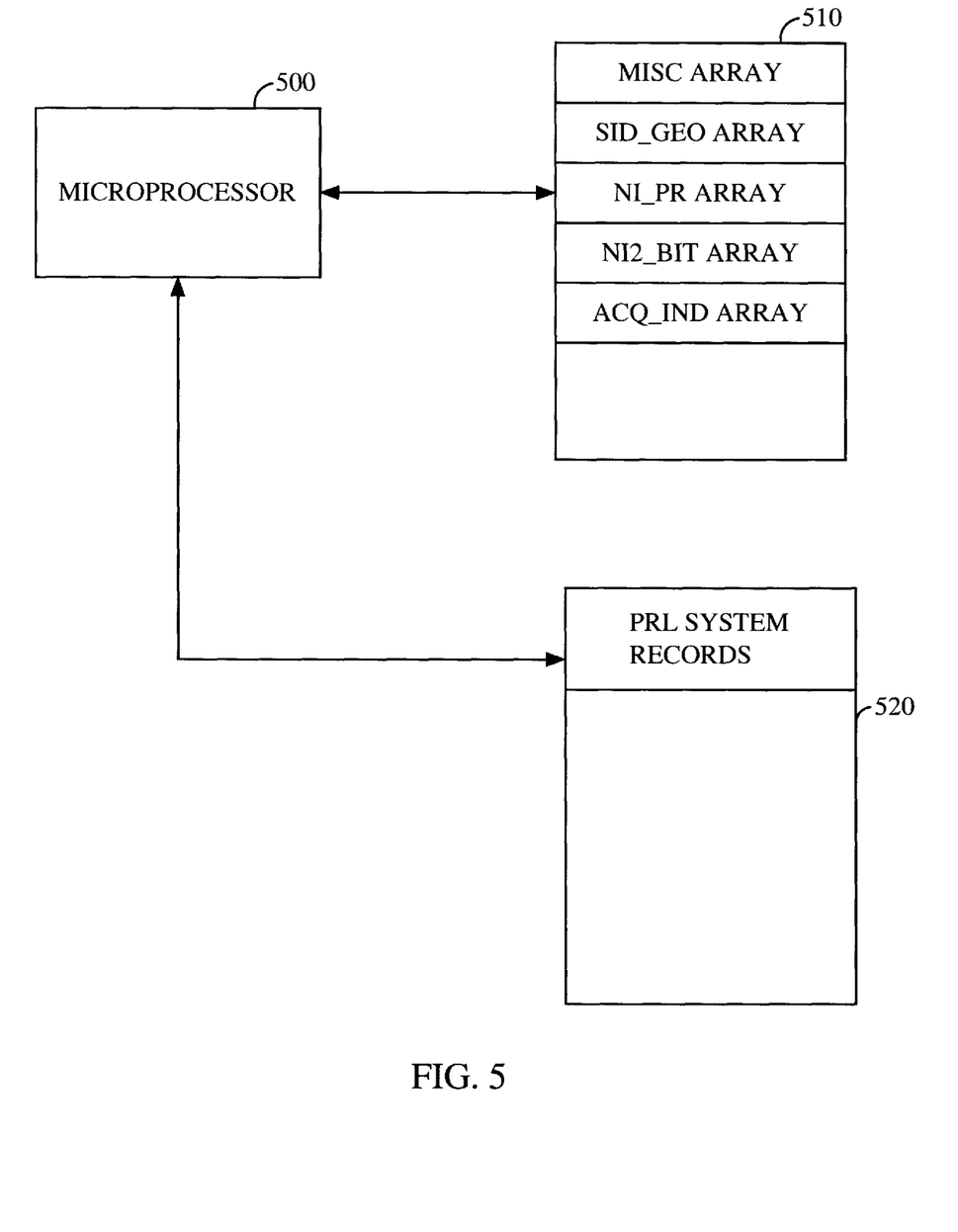
FIG. 5 is a block diagram showing the components of a system for storing and accessing system records in the PRL in response to an index value, in accordance with a preferred embodiment of the present invention.

The data accessing and storage methods described above are preferably implemented in software on the microprocessor controller 510 (shown in FIG. 5) that is typically used for accessing the RAM 520 and non-volatile memory 530 in a mobile phone. The illustration of the RAM 520 in FIG. 5 depicts the format of the RAM following the end of the data partitioning process shown in FIGS. 4, 4A, 4B and 4C.

The previous description of the preferred embodiments is provided to enable any person skilled in the art to make and use the present invention. The various modifications to these embodiments will be readily apparent to those skilled in the art, and the generic principles defined herein may be applied to other embodiments without the use of inventive faculty. Thus, the present invention is not intended to be limited to the methods and apparatuses shown herein but is to be accorded the widest scope consistent with the claims set forth below.

What is claimed is:

1. A method for storing and accessing a preferred roaming list (PRL) stored in a mobile telephone, the PRL being formed of a plurality of variable size system records, each of the system records including a system identification field, a network identification included field, a preferred_negative field, a geographical region indicator field, and an acquisition parameter information field, each of the system records optionally including a network identification field, a priority field, and a roaming indicator field, comprising the steps of:

(A) storing the network identification fields, the priority fields and the roaming indicator fields in the plurality of system records in a first array; storing the system identification fields and the geographical region indicator fields in the plurality of system records in a second array; storing a first bit of the network identification included fields and the preferred_negative fields in the plurality of system records in a third array; storing a second bit of the network identification included fields in the plurality of system records in a fourth array; and storing the acquisition parameter information fields in the plurality of system records in a fifth array;

(B) receiving a first index value corresponding to a selected one of the plurality of system records to be accessed;

(C) evaluating, in response to the first index value, entries in the third array in order to access the first bit of the network identification included field and the preferred_negative field associated with the selected system record and in order to determine a second index value for locating any network identification field, priority field or roaming indicator field associated with the selected system record in the first array;

(D) accessing, in response to the second index value, any network identification field, priority field or roaming indicator field associated with the selected system record in the first array; and (E) accessing, in response to the first index value, the system identification field and the geographical region indicator field associated with the selected system record and stored in the second array.

2. The method of claim 1, further comprising the step of:
(F) accessing, in response to the first index value, the acquisition parameter information field associated with the selected system record and stored in the fifth array.

3. The method of claim 2, further comprising the step of:
(G) accessing, in response to the first index value, the second bit of the network identification included field associated with the selected system record and stored in the fourth array.

4. The method of claim 1, wherein step (C) includes the step of sequentially applying entries in the third array to a lookup table in order to calculate the second index value.

5. The method of claim 1, wherein the first index value received in step (B) corresponds to an offset between a position of the selected system record and a previously accessed system record.

6. The method of claim 1, wherein step (A) further comprises reading the plurality of system records from non-volatile memory in the mobile telephone and storing the plurality of system records in random access memory (RAM) in the mobile telephone.

7. The method of claim 6, wherein the plurality of system records are manipulated within the RAM during step (A) in order to partition the RAM into the first, second, third, fourth and fifth arrays.

8. The method of claim 7, wherein step (A) comprises the steps of:
(i) reading a first group of system records from the non-volatile memory; storing the network identification fields, the priority fields and the roaming indicator fields associated with the first group of system records in a first area in the RAM; storing the system identification fields and the geographical region indicator fields associated with the first group of system records in a first buffer; storing a first bit of the network identification included fields and the preferred_ negative fields associated with the first group of system records in a second buffer; storing a second bit of the network identification included fields associated with the first group of system records in a third buffer; and storing the acquisition parameter information fields associated with the first group of system records in a fourth buffer;

(ii) marking a first end position in RAM of the network identification fields, the priority fields and the roaming indicator fields stored in step (i), reading all remaining un-read system records and storing the remaining un-read system records in the RAM following the first end position.

9. The method of claim 8, wherein step (A) further comprises the step of:

(iii) marking a second end position in the RAM corresponding to the end position in the RAM of the remaining un-read system records stored in step (ii), and then storing a portion of the second array by copying the first buffer into the RAM following the second end position.

10. The method of claim 9, wherein step (A) further comprises the step of:
(iv) marking a third end position in the RAM corresponding to the end position in the RAM of the first buffer stored in step (iii), and then storing a portion of the third array by copying the second buffer into the RAM following the third end position.

11. The method of claim 10, wherein step (A) further comprises the step of:
(v) marking a fourth end position in the RAM corresponding to the end position in the RAM of the second buffer stored in step (iv), and then storing a portion of the fourth array by copying the third buffer into the RAM following the fourth end position.

12. The method of claim 11, wherein step (A) further comprises the step of:
(vi) marking a fifth end position in the RAM corresponding to the end position in the RAM of the third buffer stored in step (v), and then storing a portion of the fifth array by copying the fourth buffer into the RAM following the fifth end position.

13. The method of claim 12, wherein step (A) further comprises the steps of:
(vii) reading, from the first end position in the RAM, a further group of system records; storing at the first end position in the RAM the network identification fields, the priority fields and the roaming indicator fields associated with the further group of system records; storing the system identification fields and the geographical region indicator fields associated with the further group of system records in the first buffer; storing a first bit of the network identification included fields and the preferred_negative fields associated with the further group of system records in the second buffer; storing a second bit of the network identification included fields associated with the further group of system records in the third buffer; and storing the acquisition parameter information fields associated with the further group of system records in the fourth buffer;

(viii) designating the end position in RAM of the network identification fields, the priority fields and the roaming indicator fields stored in step (vii) as the first end position, and then moving all remaining system records following the first end position in RAM to the first end position;

(ix) designating the end position in the RAM of the system records moved in step (viii) as the second end position and moving the second array to the second end position;

(x) storing a further portion of the second array in RAM by appending the first buffer to the end of the second array moved in step (ix);

(xi) designating the end position in the RAM of the second array appended in step (x) as the third end position and moving the third array to the third end position;

(xii) storing a further portion of the third array in RAM by appending the second buffer to end of the third array moved in step (xi);

(xiii) designating the end position in the RAM of the third array appended in step (xii) as the fourth end position and moving the fourth array to the fourth end position;

(xiv) storing a further portion of the fourth array in RAM by appending the third buffer to end of the fourth array moved in step (xiii);

(xv) designating the end position in the RAM of the fourth array appended in step (xiv) as the fifth end position and moving the fifth array to the fifth end position;

(xvi) storing a further portion of the fifth array in RAM by appending the fourth buffer to end of the fifth array moved in step (xv);

(xviii) repeating steps (vii) to (xvi) until all system records have been processed.

14. A method for storing and accessing a preferred roaming list (PRL) stored in a mobile telephone, the PRL being formed of a plurality of variable size system records, each of the system records including a system identification field, a network identification included field, a preferred_negative field, a geographical region indicator field, and an acquisition parameter information field, each of the system records optionally including a network identification field, a priority field, and a roaming indicator field, comprising the steps of:

(A) storing the network identification fields, the priority fields and the roaming indicator fields in the plurality of system records in a first array; storing the system identification fields and the geographical region indicator fields in the plurality of system records in a second array; storing a first bit of the network identification included fields and the preferred_negative fields in the plurality of system records in a third array; storing a second bit of the network identification included fields in the plurality of system records in a fourth array; and storing the acquisition parameter information fields in the plurality of system records in a fifth array;

(B) receiving a first index value corresponding to a selected one of the plurality of system records to be accessed; and (C) accessing, in response to the first index value, the system identification field associated with the selected system record and stored in the second array.

15. An apparatus for storing and accessing a preferred roaming list (PRL) stored in a mobile telephone, the PRL being formed of a plurality of variable size system records, each of the system records including a system identification field, a network identification included field, a preferred_negative field, a geographical region indicator field, and an acquisition parameter information field, each of the system records optionally including a network identification field, a priority field, and a roaming indicator field, comprising:

(A) a random access memory that stores the network identification fields, the priority fields and the roaming indicator fields in the plurality of system records in a first array; the random access memory storing the system identification fields and the geographical region indicator fields in the plurality of system records in a second array; the random access memory storing a first bit of the network identification included fields and the preferred_negative fields in the plurality of system records in a third array; the random access memory storing a second bit of the network identification included fields in the plurality of system records in a fourth array; and the random access memory storing the acquisition parameter information fields in the plurality of system records in a fifth array; and (B) a microprocessor, coupled to the random access memory, that receives a first index value corresponding to a selected one of the plurality of system records to be accessed and then evaluates, in response to the first index value, entries in the third array in order to access the first bit of the network identification included field and the preferred_negative field associated with the selected system record and in order to determine a second index value for locating any network identification field, priority field or roaming indicator field associated with the selected system record in the first array;

(C) wherein said microprocessor accesses, in response to the second index value, any network identification field, priority field or roaming indicator field associated with the selected system record in the first array; and (D) wherein said microprocessor accesses, in response to the first index value, the system identification field and the geographical region indicator field associated with the selected system record and stored in the second array.

16. An apparatus for storing and accessing a preferred roaming list (PRL) stored in a mobile telephone, the PRL being formed of a plurality of variable size system records, each of the system records including a system identification field, a network identification included field, a preferred_negative field, a geographical region indicator field, and an acquisition parameter information field, each of the system records optionally including a network identification field, a priority field, and a roaming indicator field, comprising:

(A) a random access memory that stores the network identification fields, the priority fields and the roaming indicator fields in the plurality of system records in a first array; the random access memory storing the system identification fields and the geographical region indicator fields in the plurality of system records in a second array; the random access memory storing a first bit of the network identification included fields and the preferred_negative fields in the plurality of system records in a third array; the random access memory storing a second bit of the network identification included fields in the plurality of system records in a fourth array; and the random access memory storing the acquisition parameter information fields in the plurality of system records in a fifth array; and (B) a microprocessor, coupled to the random access memory, that receives a first index value corresponding to a selected one of the plurality of system records to be accessed and then accesses, in response to the first index value, the system identification field associated with the selected system record and stored in the second array.

* * * * *